F. S. HYATT.
PROTECTIVE CASING FOR GLASS BOTTLES.
APPLICATION FILED AUG. 25, 1911.
1,063,351.
Patented June 3, 1913.
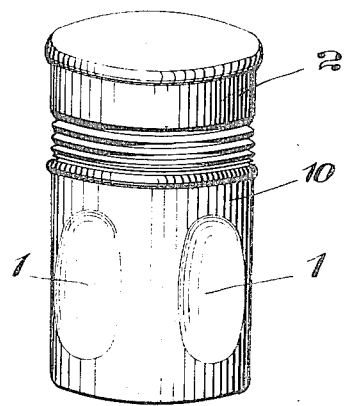
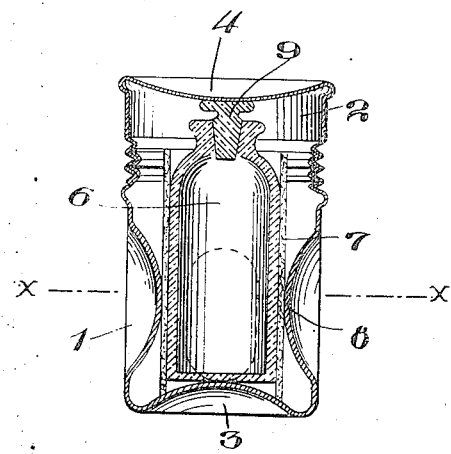
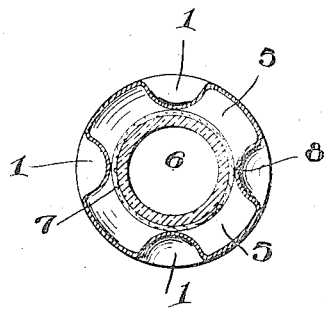
WITNESSES
INVENTOR
FRANK S. HYATT.
BY
ATTORNEYS

UNITED STATES PATENT OFFICE.

FRANK S. HYATT, OF BROOKLYN, NEW YORK.

PROTECTIVE CASING FOR GLASS BOTTLES.

1,063,351.  Specification of Letters Patent.  Patented June 3, 1913.

Application filed August 25, 1911. Serial No. 646,047.

*To all whom it may concern:*

Be it known that I, FRANK S. HYATT, a citizen of the United States, and a resident of Brooklyn, in the county of Kings and State of New York, have invented certain new and useful Improvements in Protective Casings for Glass Bottles, of which the following is a specification.

My invention relates to protective casings or inclosures for bottles and similar receptacles of glass or other fragile material and has for its main object the construction of a casing in such a way as to make a bottle contained therein immune from breakage if the casing is allowed to fall.

Another object of my invention is the construction of a casing which is both simple and inexpensive to manufacture.

A further object of my invention is the construction of a casing in which is formed grooves or pockets which may be used for the carrying of any desired articles such as thermometers etc.

To these ends my invention consists in the protective casing hereinafter more particularly described and then specified in the claims.

Figure 1 illustrates in front elevation a preferred form of casing made according to my invention. Fig. 2 shows a vertical section through Fig. 1. Fig. 3 shows a sectional plan view of the casing on the line x—x.

The body of the protective casing is provided with a plurality of concavities or depressions indicated by 1 which are formed in the wall of the body of the casing 10, each preferably being a duplicate of the others, although their maximum depth is their only dimension which must remain constant. These concavities are preferably arranged to leave free spaces within the body extending longitudinally thereof for the purpose to be presently described. The cover 2 of the casing is preferably screwed to the body 10 although any other means of attachment may be used.

In Fig. 2 the concavities formed in the wall of the body of the casing are shown to better advantage. A glass bottle represented by 6 is shown preferably inclosed in a sleeve 7 which is made preferably of asbestos and which holds the bottle firmly in place within the casing. The asbestos sleeve and the bottle within it are held securely by coming into contact with the inner surfaces of the apices 8 of the several concavities formed in the wall of the body of the casing. It is obvious that the sleeve could be omitted altogether and the casing would still retain its features of secureness and protection. A concavity indicated at 3 is formed in the base of the casing, and a concavity 4 is formed in the top of the cover 2 as shown. The inclosed bottle 6 is supported at its base by the inner surface of the apex of the concavity 3, and the stopper 9 of the bottle is supported and held in place by coming into contact with the inner surface of the apex of the concavity 4 when the cover 2 is fastened to the body of the casing. The Fig. 2 shows the inclosed bottle held securely in place as to its sides as well as its two ends, and as will be obvious if the casing be allowed to drop, no part of its surface which comes into contact either directly or indirectly with any portion of the bottle will be affected, thereby insuring the safety of the bottle as to breakage or damage no matter how it may be allowed to fall.

Preferably four concavities are formed in the wall of the casing and one each in the base of the body and top of the cover of the casing, although I do not limit myself to any specific number. These concavities 1 are seen to good advantage in Fig. 3 where they appear as convexities. The spaces 5 between these convexities and the inner wall of the body of the casing and the bottle may be used conveniently for the carrying of any object such as a thermometer, or anything else which it may be desired to use with the contents of the bottle.

The casing itself is made preferably of a light and strong metal like aluminum, although wood could also be used as well as other substances.

What I claim as my invention is:

An anti-breakage container for bottles and other receptacles made of glass or similar fragile material, consisting of a sheet metal body portion having a plurality of longitudinal inwardly disposed concavities in its side walls terminating intermediate of its ends, an inwardly disposed concavity in the bottom of said body portion and a cap or closure adapted to close the opening of said body and provided with an inwardly disposed concavity, the said concavities being adapted to hold the contained bottle out of contact with the outer edges of the container.

Signed at New York, in the county of New York and State of New York, this 24th day of August A. D. 1911.

FRANK S. HYATT.

Witnesses:
ERIK MEURLING,
IRENE LEFKOWITZ.